(12) United States Patent
Bernhaupt

(10) Patent No.: US 8,695,480 B2
(45) Date of Patent: Apr. 15, 2014

(54) DEVICE FOR DRIVING A PISTON PUMP

(75) Inventor: Martin Bernhaupt, Oberalm (AT)

(73) Assignee: Robert Bosch GmbH, Stuttgart-Feuerbach (DE)

( * ) Notice: Subject to any disclaimer, the term of this patent is extended or adjusted under 35 U.S.C. 154(b) by 1203 days.

(21) Appl. No.: 12/593,106

(22) PCT Filed: Mar. 19, 2008

(86) PCT No.: PCT/AT2008/000099
§ 371 (c)(1),
(2), (4) Date: Sep. 25, 2009

(87) PCT Pub. No.: WO2008/116241
PCT Pub. Date: Oct. 2, 2008

(65) Prior Publication Data
US 2010/0040496 A1    Feb. 18, 2010

(30) Foreign Application Priority Data

Mar. 26, 2007    (AT) .................................. A 467/2007

(51) Int. Cl.
*F04B 9/04* (2006.01)
*F16H 53/00* (2006.01)

(52) U.S. Cl.
USPC .................................. 92/129; 74/55; 74/567

(58) Field of Classification Search
USPC .......................................................... 92/129
See application file for complete search history.

(56) References Cited

U.S. PATENT DOCUMENTS

| | | | |
|---|---|---|---|
| 2,804,863 A | 9/1957 | Bensinger et al. | |
| 3,981,281 A | 9/1976 | Deschler et al. | |
| 4,757,795 A | 7/1988 | Kelly | |
| 4,962,743 A | 10/1990 | Perr et al. | |

FOREIGN PATENT DOCUMENTS

| | | |
|---|---|---|
| DE | 2329734 A1 | 1/1974 |
| EP | 0244340 B1 | 7/1992 |
| GB | 2133467 A | 7/1984 |
| JP | 05263727 A | 10/1993 |
| JP | 07133749 A | 5/1995 |
| WO | WO 2005/040558 A1 | 5/2005 |

*Primary Examiner* — F. Daniel Lopez
(74) *Attorney, Agent, or Firm* — Fitch, Even, Tabin & Flannery LLP

(57) ABSTRACT

In a device for driving a piston pump, including at least one cam (10) mounted on a camshaft (4) and cooperating with the pump piston (3), or a component arranged between the cam (10) and the pump piston (3), to generate a reciprocating movement of the pump piston (3), wherein the cam (10) has a cam elevation curve (15, 18) with a first section for the upward stroke and a second section for the downward stroke, the cam elevation curve (15, 18), departing from a shape substantially corresponding to that of a sine wave (14, 19), is modified in a manner that, in comparison to the shape of a sine wave (14, 19), an increase in the piston acceleration occurs at the beginning of the upward stroke and a decrease of the piston deceleration occurs at the end of the upward stroke.

13 Claims, 3 Drawing Sheets

DEVICE FOR DRIVING A PISTON PUMP

CROSS-REFERENCE TO RELATED APPLICATIONS

This is a U.S. National Phase of International Application PCT/AT2008/000099, filed Mar. 19, 2008, and claims the benefit of priority under 35 U.S.C. §119 based on Austria Application No. A 467/2007, filed Mar. 26, 2007, the entire disclosures of which applications are hereby incorporated herein by reference.

The invention relates to a device for driving a piston pump, including at least one cam mounted on a camshaft and cooperating with the pump piston, or a component arranged between the cam and the pump piston, to generate a reciprocating movement of the pump piston, said cam having a cam elevation curve with a first section for the upward stroke and a second section for the downward stroke.

Piston pumps are, for instance, employed as high-pressure pumps in internal combustion engines. A high-pressure pump, during the operation of the motor, provides the high-pressure fuel that is to be stored in the rail. In order to be able to ensure functioning in any operating point, the maximum pump delivery rate of the high-pressure pump must be substantially higher than the full-load quantity required by the motor. On the other hand, only a small flow rate of the pump is required during partial-load operation or at idling. An electronic control of the feeding amount is, therefore, effected via a fuel metering unit (FMU), which determines the flow to the high-pressure pump as a function of the fuel pressure in the rail. Thus, only the amount actually required in the respective operating point must be fed to the rail, without any incurring excess amount having to be relieved again via a pressure control valve and returned to the tank, which would involve high energy losses and entail strong heating of the fuel.

A high-pressure pump is comprised of at least one pump element which is driven via a roller tappet or directly by a cam shaft. On the suction side, a feed pump, e.g. a gear pump, supplies fuel from the tank at a low pressure. On the pressure side, the compressed fuel reaches the rail via a collector.

A special challenge with cam-driven common-rail high-pressure pumps consists in the high pump speeds applied for high specific pump capacities. The cam elevations of these pumps are, in general, composed of various partial sections such as tangent elevations or circular arcs, with positive or negative radii. Hence result pregiven acceleration courses such as linear, sinusoidal or parabolic courses. Furthermore, there are cam elevations having sine (or cosine) shapes over their entire stroke courses.

Different cam elevation curves are known from EP 244 340 B1, JP 7133749A and JP 5263727 A.

The requirements of the shape of a cam are to reach as high a ceiling speed as possible so as to provide an acceleration of the roller tappet as low as possible in the region of the upper dead center (UD) such that any risk of lifting off of the roller tappet will be excluded and the kinematic oscillation excitation of the pump element spring will, moreover, remain low. Cam elevations composed of different subsections can reach high ceiling speeds, yet may lead to high excitation frequencies for the pump element spring due to kinks in the acceleration curves, since high-order harmonic oscillations may occur in the feeding frequency. On the other hand, sinusoidal cam elevations offer the advantage of a low oscillation excitation of the spring (feeding frequency only, no harmonic oscillations), yet at a limited potential in terms of the ceiling speed.

For this reason, the object of the present invention resides in designing a cam elevation curve with a low kinematic oscillation excitation of the pump element spring with a simultaneous increase of the ceiling speed.

To solve this object, the invention essentially consists in that the cam elevation curve, departing from a shape substantially corresponding to that of a sine wave, is modified in a manner that, in comparison to the shape of a sine wave, an increase in the piston acceleration occurs at the beginning of the upward stroke and a decrease of the piston deceleration occurs at the end of the upward stroke, wherein the cam elevation curve in its first section has a shape resulting from the superposition of a semioscillation of a first sine wave with a second sine wave, said second sine wave having twice the frequency of, and a lower amplitude than, said first sine wave. By the piston deceleration, in particular, decreasing at the end of the upward stroke, i.e. by a flatter course of the cam elevation curve where the pump piston reaches the upper dead center, the acceleration component decreases in the sense of a lifting off of the piston from the cam so as to allow for an increase in the ceiling speed. At the same time, the extent of the oscillation excitation of the spring is kept low, since the cam elevation curve is shaped departing from a sine wave. In order to avoid the generation of undesired oscillation components, the device is designed such that the cam elevation curve, in its first section, has a shape resulting from the superposition of a semioscillation of a first sine wave with a second sine wave, said second sine wave having twice the frequency of, and a lower amplitude than, said first sine wave. By such a superposition, the desired effect of the piston speed increasing at the beginning of the upward stroke and the piston deceleration decreasing at the end of the upward stroke will be reached while, at the same time, avoiding the uncontrolled introduction of harmonic oscillations, which would lead to a lifting of the pump piston already at comparatively low speeds.

The superposition of the sinusoidal oscillation with a further sinusoidal oscillation of twice the frequency may advantageously take place over the total length of the cam elevation curve, and in this context it is preferably provided that the cam elevation curve has a shape resulting from the superposition of a full oscillation of a first sine wave with a second sine wave, said second sine wave having twice the frequency of, and a lower amplitude than, said first sine wave.

As already mentioned, the amplitude of the second sine wave, i.e. the sine wave used for the superposition, is to be lower than the amplitude of the first sine wave, i.e. the sine wave defining the basic shape of the cam elevation. In this context, a configuration is preferred, in which the amplitude of the second sine wave is $1/5$ to $1/15$, preferably $1/8$ to $1/12$, of the amplitude of the first sine wave. By keeping the amplitude of the second sine wave below the amplitude of $1/6$ of the amplitude of the first sine wave, the extent of the introduction of additional oscillations can be kept within acceptable limits so as to prevent the spring from being excited in an undesired manner.

In order to even better adapt the cam elevation curve to reaching higher limit numbers, it is provided according to a preferred configuration that at least one further sine wave with the frequency of a harmonic and, in particular, an even-number harmonic is superposed. In this case, it is, for instance, possible, in addition to the superposition with a sine wave of twice the frequency, to superpose the fundamental oscillation with a further sine wave having four times the frequency of the fundamental oscillation. To this end, even-number harmonics are particularly suitable in order that the cam elevation curve will not contain any local indentations or the like.

In the following, the invention will be explained in more detail by way of an exemplary embodiment schematically illustrated in the drawing.

Figure 1:
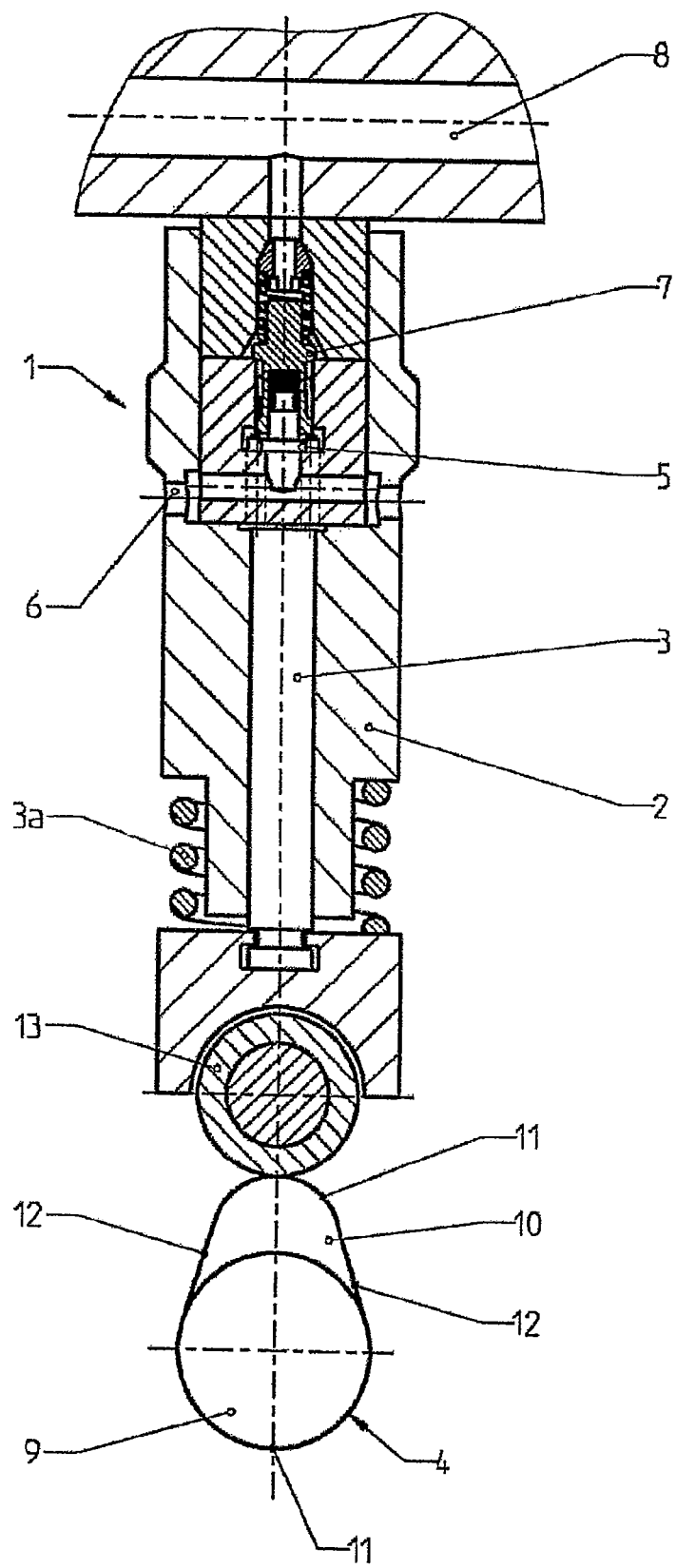
FIG. 1 illustrates the basic structure of a pump element according to the prior art.

FIG. 1 illustrates the basic structure of a pump element according to the prior art. A pump element 1 is comprised of a cylinder 2 and a piston 3 guided within the cylinder so as to be displaceable in the longitudinal sense. A cam shaft 4 driven by the combustion engine reciprocates the piston 3 within the cylinder 2, the piston spring 3a maintaining the contact between the roller tappet 13 connected with the piston 3 and the cam shaft 4. Fuel is sucked from the pump suction volume 6 via a suction valve 5 during the descending travel of the piston 3 and subsequently pressed into the rail 8 via a pressure valve 7 during the ascending travel. The cam shaft 4 is comprised of a shaft portion 9 and a cam 10 for each pump element 1 to be acted upon. The contour of the cam 10, which determines the stroke of the pump element 1, as a rule, is composed of several circular 11 and tangential cam portions 12. Alternatively, the shape of the cam may also result from a sinusoidal oscillation.

Figure 2:
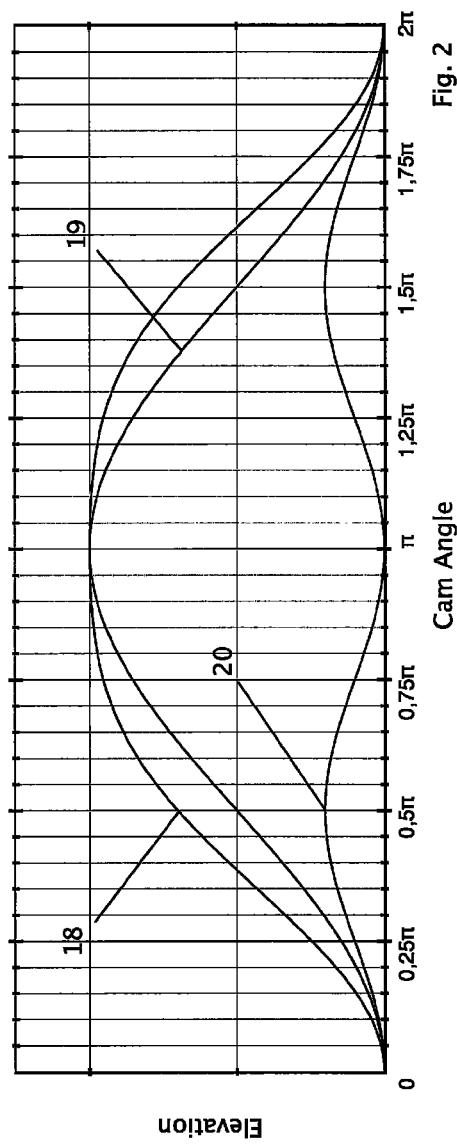
FIG. 2 depicts the cam elevation curve according to the invention.

The cam shape according to the invention is illustrated in FIG. 2. From this, it is apparent that the cam elevation curve 18 results from the superposition of the first sine wave 19 with a second sine wave 20, the second sine wave 20 having the double frequency and a lower amplitude as compared to the first sine wave 19. In this respect, it should be noted that the term sine wave in the context of the present invention serves to denote a wave as illustrated in FIG. 2, which corresponds to a curve resulting, in the strict mathematical sense, from a sine function ranging between −90 and +270°. Such a curve could also be denoted as a cosine oscillation with a negative sign.

Figure 3:
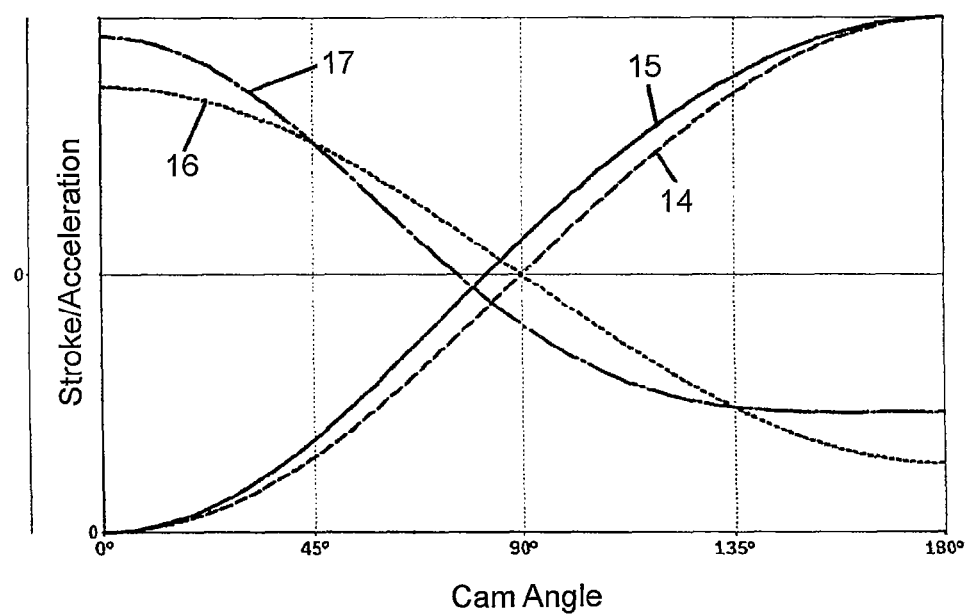
FIG. 3 shows the course of the stroke and acceleration of the pump piston.

FIG. 3 illustrates the course of stroke 14 and acceleration 16 with a sinus-shaped cam as well as the stroke 15 and acceleration course 17 with a double-sine cam according to the invention, the cam angle being plotted on the X-axis and the stroke/acceleration being plotted on the Y-axis. The acceleration 16 with the sine cam at the beginning of feeding (0°) is smaller than the acceleration 17 of the double-sine cam. At the upper dead center (180°), the deceleration 17 of the double-sine cam is smaller than the deceleration 16 of the sine cam such that a higher ceiling speed will be attainable. Alternatively, there is the option to still superpose further harmonics so as to further increase the lift-off speed.

The invention claimed is:

1. A device for driving a piston pump, including at least one cam mounted on a camshaft and cooperating with the pump piston, or a component arranged between the cam and the pump piston, to generate a reciprocating movement of the pump piston, said cam having a cam elevation curve with a first section for the upward stroke and a second section for the downward stroke, characterized in that the cam elevation curve (15, 18), departing from a shape substantially corresponding to that of a sine wave (14, 19), is modified in a manner so that an increase in the piston acceleration occurs at the beginning of the upward stroke and a decrease of the piston deceleration occurs at the end of the upward stroke, wherein the cam elevation curve (18) in its first section has a shape resulting from the superposition of a semi-oscillation of a first sine wave (19) with a second sine wave (20), said second sine wave (20) having twice the frequency of, and a lower amplitude than, said first sine wave (19).

2. A device of claim 1, characterized in that the cam elevation curve (18) has a shape resulting from the superposition of a full oscillation of a first sine wave (19) with a second sine wave (20), said second sine wave (20) having twice the frequency of, and a lower amplitude than, said first sine wave (19).

3. A device of claim 1, characterized in that the amplitude of the second sine wave (20) is $1/5$ to $1/15$ of the amplitude of the first sine wave (19).

4. A device of claim 1, characterized in that at least one further sine wave with the frequency of a harmonic is superposed.

5. A device of claim 1, characterized in that the component arranged between the pump piston (3) and the cam (10) is designed as a roller tappet (13).

6. A device of claim 1, characterized in that the amplitude of the second sine wave (20) is $1/8$ to $1/12$ of the amplitude of the first sine wave.

7. A device of claim 1, characterized in that at least one further sine wave with the frequency of an even-number harmonic is superposed.

8. A cam to be used in a device for driving a piston pump, said cam having a cam elevation curve with a first section for the upward stroke and a second section for the downward stroke, characterized in that the cam elevation curve (15, 18), departing from a shape substantially corresponding to that of a sine wave (14, 19), is modified in a manner so that an increase in the piston acceleration occurs at the beginning of the upward stroke and a decrease of the piston deceleration occurs at the end of the upward stroke, wherein the cam elevation curve (18) in its first section has a shape resulting from the superposition of a semi-oscillation of a first sine wave (19) with a second sine wave (20), said second sine wave (20) having twice the frequency of, and a lower amplitude than, said first sine wave (19).

9. A cam of claim 8, characterized in that the cam elevation curve (18) has a shape resulting from the superposition of a full oscillation of a first sine wave (19) with a second sine wave (20), said second sine wave (20) having twice the frequency of, and a lower amplitude than, said first sine wave (19).

10. A cam of claim 8, characterized in that the amplitude of the second sine wave (20) is $1/5$ to $1/15$ of the amplitude of the first sine wave (19).

11. A cam of claim 8, characterized in that at least one further sine wave with the frequency of a harmonic is superposed.

12. A cam of claim 8, characterized in that the amplitude of the second sine wave (20) is $1/8$ to $1/12$ of the amplitude of the first sine wave (19).

13. A cam of claim 8, characterized in that at least one further sine wave with the frequency of an even number harmonic is superposed.

* * * * *